(12) United States Patent
Secker-Walker et al.

(10) Patent No.: US 8,996,372 B1
(45) Date of Patent: Mar. 31, 2015

(54) USING ADAPTATION DATA WITH CLOUD-BASED SPEECH RECOGNITION

(71) Applicant: Amazon Technologies, Inc., Reno, NV (US)

(72) Inventors: Hugh Secker-Walker, Newburyport, MA (US); Bjorn Hoffmeister, Seattle, WA (US); Ryan Thomas, Redmond, WA (US); Stan Salvador, Tega Cay, SC (US); Karthik Ramakrishnan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 13/664,363

(22) Filed: Oct. 30, 2012

(51) Int. Cl.
*G10L 15/00* (2013.01)
*G10L 15/06* (2013.01)
*G10L 15/34* (2013.01)

(52) U.S. Cl.
CPC ........................................ *G10L 15/34* (2013.01)
USPC .......................... 704/244; 704/243; 704/231

(58) Field of Classification Search
CPC ............ G10L 15/30; G10L 2015/0635; G10L 15/065; G10L 15/07; G10L 15/075
USPC .................................................. 704/231–257
See application file for complete search history.

(56) References Cited

U.S. PATENT DOCUMENTS

| | | | | |
|---|---|---|---|---|
| 7,440,894 | B2 * | 10/2008 | Zhou et al. ..................... | 704/243 |
| 7,925,505 | B2 * | 4/2011 | Wu ................. | 704/236 |
| 2002/0138274 | A1 * | 9/2002 | Sharma et al. ................ | 704/270 |
| 2011/0029313 | A1 * | 2/2011 | Braho et al. ................... | 704/251 |
| 2012/0072212 | A1 * | 3/2012 | Parthasarathy et al. ........ | 704/231 |
| 2012/0185250 | A1 * | 7/2012 | Beach et al. .................. | 704/235 |

\* cited by examiner

*Primary Examiner* — Jesse Pullias
(74) *Attorney, Agent, or Firm* — Knobbe, Martens, Olson & Bear, LLP

(57) ABSTRACT

Speech recognition may be improved using data derived from an utterance. In some embodiments, audio data is received by a user device. Adaptation data may be retrieved from a data store accessible by the user device. The audio data and the adaptation data may be transmitted to a server device. The server device may use the audio data to calculate second adaptation data. The second adaptation data may be transmitted to the user device. Synchronously or asynchronously, the server device may perform speech recognition using the audio data and the second adaptation data and transmit speech recognition results back to the user device.

31 Claims, 9 Drawing Sheets

USING ADAPTATION DATA WITH CLOUD-BASED SPEECH RECOGNITION

BACKGROUND

Speech models, such as environment models, language models and acoustic models may be used to facilitate speech recognition. For example, an environment model may indicate the noise characteristics of an operating environment. An acoustic model may be used to identify phonemes or other speech units present in an utterance. A language model may be used to convert the phonemes or other speech units identified by the acoustic model into words, phrases, and the like. Generally, people speak (and speech recognition devices operate) in a wide variety of environments and with a wide variety of speech patterns. For example, people speak with varying frequencies and/or vocal tract lengths. In addition, the environment in which a person speaks into a speech recognition device may introduce noise, such as an echo or wind. The acoustic models may be modeled to take into account particular vocal frequencies, vocal tract lengths, environmental noise, and the like. However, because the way people speak and the environment in which they are speaking may vary greatly, some captured audio data may not correspond correctly to the speech models.

In some cases, audio data captured by such a speech recognition device may be adjusted, for example via normalization or utilizing speech-related statistics, so that it corresponds more closely to the speech models. However, calculating such statistics may require a significant amount of audio data. In addition, each time a particular person speaks, the captured audio data may need to be adjusted in a similar manner. It is sometimes desired to produce speech recognition results as quickly as possible; however, having to calculate statistics in order to adjust the captured audio may increase the time needed to perform the speech recognition. Such calculations can lead to unacceptable delays by a speech recognition device.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Introduction

Figure 1A:
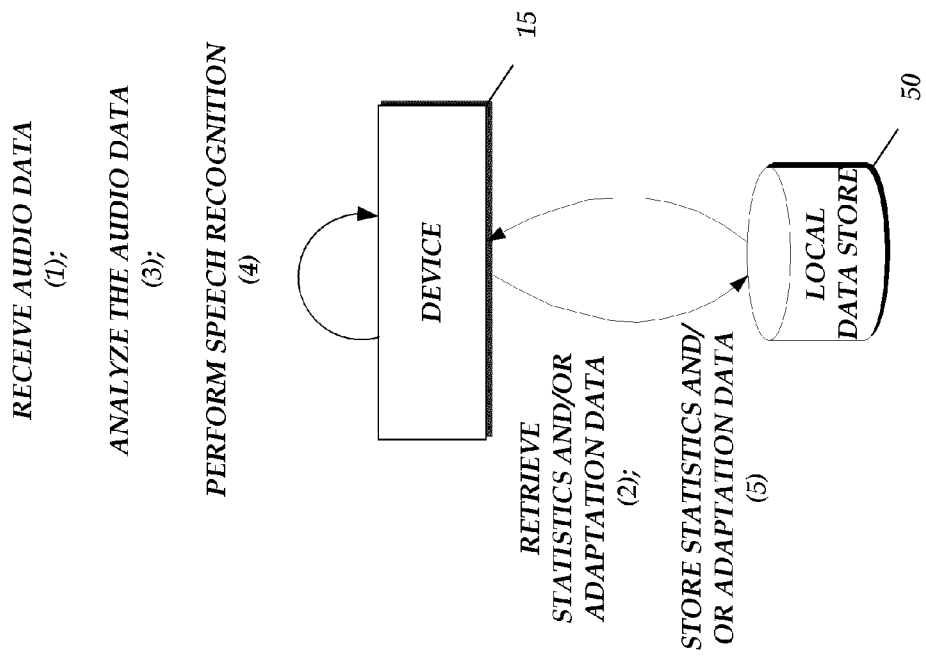
FIG. 1A is a state diagram depicting an automatic speech recognition (ASR) system dedicated to a particular individual.

In some embodiments, an automatic speech recognition system properly adjusts captured audio data while producing speech recognition results quickly and avoiding the unacceptable delays discussed above. Speech recognition systems may use various types of adaptation data to adjust the captured audio data and to improve speech recognition results. Adaptation data may be any data that relates to a speaker, group of speakers, device, or environment that may be used during speech recognition to improve speech recognition results. Examples of adaptation data include, but are not limited to, signal processing data (e.g., for performing beamforming, gain control, and echo cancellation), channel normalization data (e.g., cepstral means and/or cepstral variances that may be used to normalize feature vectors), an estimated vocal tract length that may be used to normalize the frequencies of speech through a warping procedure, and speaker adaptive transforms such as a cMLLR (constrained maximum likelihood linear regression) transform.

The adaptation data may improve speech recognition results by being applied to audio data. In particular, a frame of audio data (e.g., a 10 ms portion of speech) may be described in terms of its acoustic features, such as mel frequency, cepstral coefficients, perceptual linear predictive features, or neural network features, etc. These features may include, for example, the energy of the frame over a particular set of frequency bands; comparisons of the energies of these frequency bands to an immediately prior frame (sometimes referred to as "deltas"); and other comparisons, including higher level deltas such as second, third, and higher-order derivatives. The features of a frame may be represented as an n-dimensional vector, referred to as a feature vector. Feature vectors may be updated (e.g., transformed) by applying adaptation data to the n-dimensional vectors in the feature space. As described below, speech recognition may be performed on the transformed feature vectors to generate speech recognition results.

Adaptation data may be computed from statistics. For example, channel normalization data, such as a cepstral mean vector and/or a cepstral variance vector, may be computed from statistics including mel-frequency cepstral data computed from audio data. In some embodiments, the mel-frequency cepstral data may be stored for a certain amount of audio data, such as the most recent five minutes of audio data. In some embodiments, sufficient statistics may be computed instead, such as the mean and second moment of the mel-frequency cepstral data. The statistics and/or sufficient statistics may be different for different types of adaptation data.

In some situations, an automatic speech recognition (ASR) system is dedicated to a particular individual, such as on a personal computer, telephone, or other personal device. In these situations, the statistics and/or adaptation data used to perform ASR for the particular user may be stored on the user's device. For example, as the user uses the ASR system, statistics may be updated and/or additional statistics may be stored on the user's device. Instead or in addition, the adaptation data may be recomputed or updated from the statistics or directly from the audio data. Since the statistics and/or adaptation data is local to the device, this information is easily accessible for use during speech recognition and also to be updated.

FIG. 1A illustrates a state diagram depicting an ASR system dedicated to a particular individual, such as a user of a personal computer or other personal device. As illustrated in FIG. 1A, a device 15 may receive audio data (1). The device 15 may retrieve statistics and/or adaptation data (2) from a local data store 50. The device 15 may analyze the audio data (3) to update the statistics and/or adaptation data. The device 15 may also perform speech recognition (4) using the audio data and the adaptation data to generate speech recognition results and store the updated statistics and/or adaptation data (5) in the local data store 50.

ASR may also be provided by a cloud-based service. In this situation, a user may speak into a device, such as a computer or a cell phone, and audio data may be transmitted to a server to be converted into text. The server may return the text to the user device or may perform other operations using the text. The server may be providing services for many different users who are speaking in many different operating environments, and it may not be feasible for a server to store statistics and/or adaptation data for all users and all operating environments.

Further, each time a person speaks into a device for the purposes of speech recognition, the audio data may be transmitted to a different server. Thus, the server selected for performing the speech recognition may not have access to statistics and/or adaptation data from a previous speech recognition request.

Figure 1B:
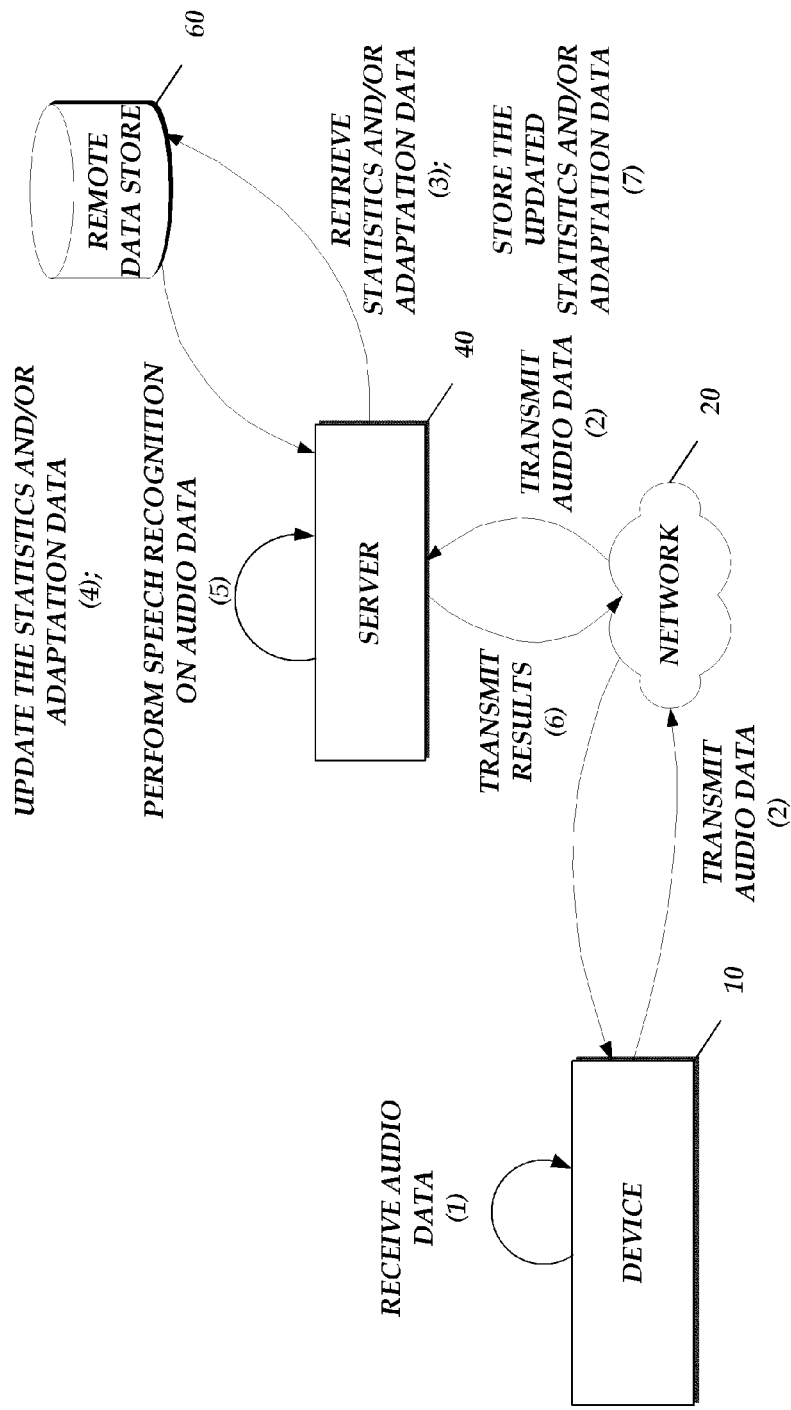
FIG. 1B is a state diagram depicting a device that uses cloud-based ASR in an illustrative network environment.
Figure 1C:
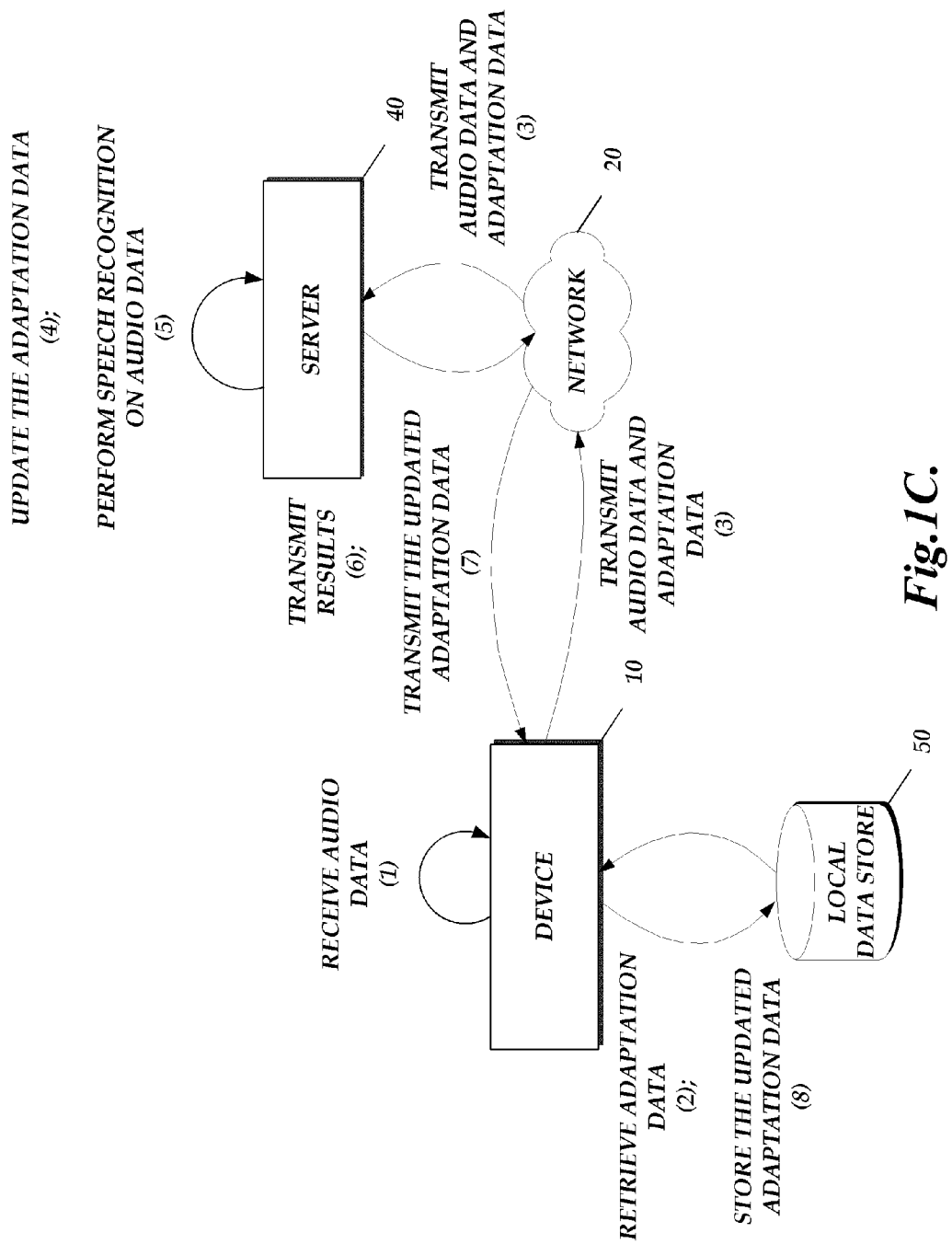
FIG. 1C is another state diagram depicting a device that uses cloud-based ASR in an illustrative network environment.
Figure 1D:
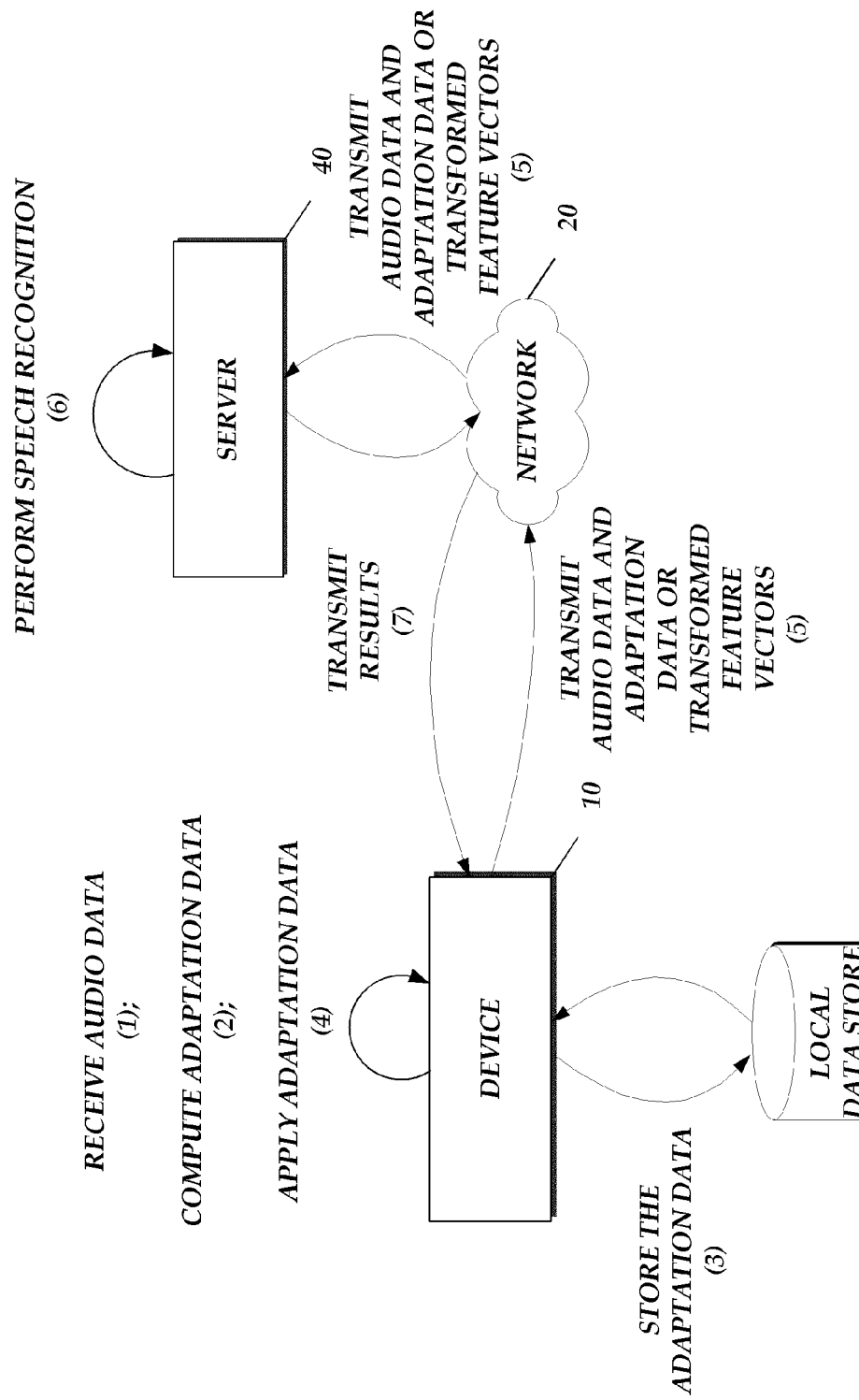
FIG. 1D is another state diagram depicting a device that uses cloud-based ASR in an illustrative network environment.

Accordingly, when using cloud-based ASR, other techniques may be utilized to access statistics used in computing adaptation data, for computing adaptation data from the statistics, and for accessing the adaptation data during speech recognition. FIGS. 1B-1D illustrate state diagrams depicting a device that uses cloud-based ASR in an illustrative network environment.

In an embodiment, adaptation data may be calculated on one of the servers in the automated speech recognition system, and the statistics and/or adaptation data may be stored in an electronic data store accessible by one or more servers in the automatic speech recognition system. For example, the adaptation data may be calculated by the server tasked with performing the speech recognition. The adaptation data may be calculated on the server before, during, and/or after performing the speech recognition. The adaptation data may then be stored in an entry of an electronic data store associated with the user or user's device such that it is accessible by one or more servers in the automatic speech recognition system. In some embodiments, a server may access stored adaptation data from the electronic data store, update the adaptation data using the audio data, and store the updated adaptation data in the electronic data store. In some embodiments, a server may also access stored statistics from the electronic data store, access stored adaptation data from the electronic data store, create additional statistics from the received audio data, update the adaptation data using both sets of statistics, and store the new statistics and the updated adaptation data in the electronic data store.

One example of an automatic speech recognition system that utilizes statistics and adaptation data in this manner is illustrated in the state diagram of FIG. 1B. In the embodiment of FIG. 1B, a device 10 may receive audio data (1). The device 10 may transmit the audio data (2) to a server 40 via a network 20. The server 40 may retrieve stored statistics and/or adaptation data (3) from a remote data store 60, update the statistics and/or the adaptation data (4) using the audio data, perform speech recognition (5) on the audio data using the adaptation data, and transmit the results (6) to the device 10. The server 40 may also store the updated statistics and/or adaptation data (7) in the remote data store 60.

In another embodiment, the adaptation data may be computed by a server and then transmitted to the device from which the audio data was received. The adaptation data may then be stored by the device in an electronic data store accessible by the device. When a user uses the device to perform speech recognition, the device may send the audio data and adaptation data to the server. The server may use the adaptation data to produce speech recognition results. The speech recognition results may then be transmitted to the device. The audio data may be further analyzed to update the adaptation data, which is then transmitted to the device. The device may store the updated adaptation data in the electronic data store for later use. In some embodiments, the device may store statistics, send the statistics or some portion thereof to the server with the adaptation data, and the server may use the statistics in updating the adaptation data.

One example of such processing is illustrated in the diagram of FIG. 1C. In the embodiment of FIG. 1C, a device 10 may receive audio data (1). The device 10 may retrieve adaptation data (2) from a local data store 50 and transmit the audio data and adaptation data (3) to a server 40 via a network 20. The server 40 may update the adaptation data (4) using the audio data, perform speech recognition (5) on the audio data using the adaptation data, and transmit the results (6) to the device 10. The server 40 may also transmit the updated adaptation data (7) to the device 10. The device 10 may store the updated adaptation data (8) in the local data store 50.

In another embodiment, the device itself generates the adaptation data. For example, the device may compute the adaptation data from audio data received by a user. The adaptation data may be stored by the device in an electronic data store accessible by the device. In some aspects, when a user uses the device to perform speech recognition, the device may send the audio data and adaptation data to the server. The server may use the adaptation data to produce speech recognition results. The speech recognition results may then be transmitted to the device. In other aspects, when a user uses the device to perform speech recognition, the device may apply the adaptation data to the audio data and send transformed feature vectors to the server. The server may produce speech recognition results based on an analysis of the transformed feature vectors. The speech recognition results may then be transmitted to the device. In some embodiments, the device may store statistics in addition to the adaptation data. After receiving audio data, the device may update or augment the existing statistics and then use the updated or augmented statistics to update the adaptation data.

One example of such processing is illustrated in the diagram of FIG. 1D. In FIG. 1D, a device 10 may receive audio data (1). The device 10 may compute adaptation data (2) using the audio data and store the adaptation data (3) in a local data store 50. In some aspects, the device 10 may transmit the audio data and the adaptation data (5) to a server 40 via a network 20. In other aspects, the device 10 may apply the adaptation data (4) and transmit transformed feature vectors (5) to the server 40 via the network 20. The server 40 may perform speech recognition (6) on the audio data using the adaptation data or on the transformed feature vectors and transmit the results (7) to the device 10.

In further embodiments, the statistics and/or adaptation data may be used to select one or more acoustic models and/or one or more language models. For example, the statistics and/or adaptation data may indicate certain acoustic model(s) and/or language model(s) that work better with the speech of a particular user using a particular device than other acoustic models and/or language models. The server and/or device may store the acoustic model(s) and/or language model(s) preferences for later use.

In still further embodiments, the server may perform speech recognition using the adaptation data generated by the device and/or the server in conjunction with base adaptation data, such as a base transform. The base transform may be computed based on statistics associated with all speech received by the device. For example, a user may speak into the device for purposes of speech recognition, and these statistics may be used to compute the base transform. In addition, a user may speak into the device for purposes other than speech recognition (e.g., to make a phone call, etc.), and these statistics may also be used to compute the base transform.

In some aspects, the base transform may be used at the start of a session (e.g., speech recognition has not been previously performed for the user on the device, the user reset the speech recognition settings, etc.). For example, at the start of a session, no adaptation data may have been computed. Thus, the base transform may be used as a default for speech recognition purposes. As speech recognition is performed, the adaptation data may be computed by the device and/or server and the base transform may carry less weight in the adjustment of the audio data.

In still further embodiments, additional data may be used to improve speech recognition. For example, data other than acoustic data may be calculated based on the audio data. Such data may include metadata associated with the user, like the age, gender, accent, native language, profession, hobbies, habits, and preferences of the user. As an example, the metadata associated with the user may be used to select and/or modify a particular language model.

System Setup—User Device and Cloud Device

Figure 2:
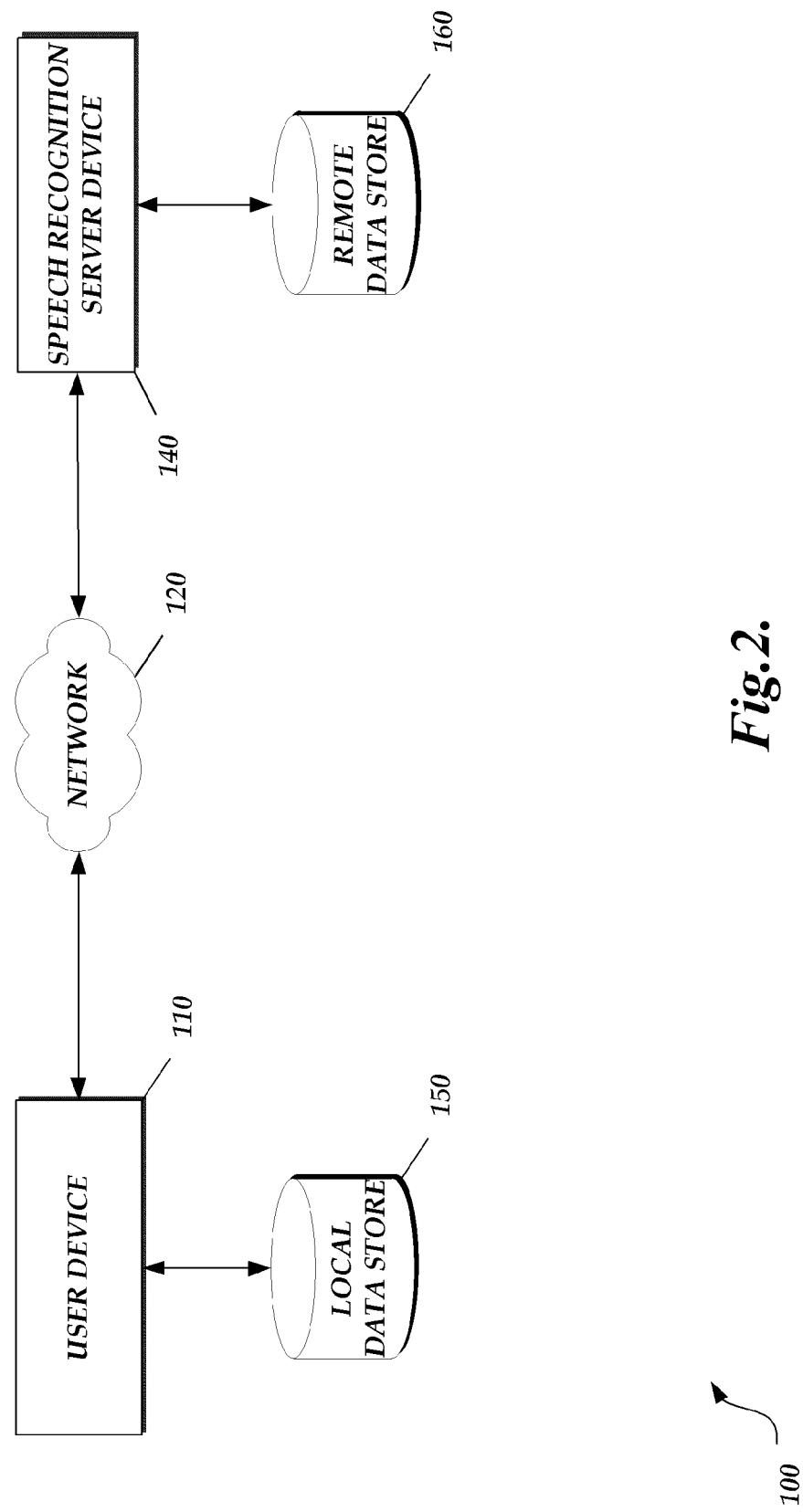
FIG. 2 is a system diagram depicting a user device in an illustrative network environment.

FIG. 2 illustrates a system diagram depicting a user device 110 in an illustrative network environment 100. In some embodiments, the network environment 100 includes the user device 110, a network 120, a speech recognition server device 140, a local data store 150, and/or a remote data store 160.

The user device 110 may be configured to receive an utterance and facilitate speech recognition. For example, the user device 110 may receive the utterance, forward the utterance via the network 120 to the speech recognition server device 140, and receive speech recognition results, as described below.

In some embodiments, the user device 110 may be configured to calculate statistics, such as sufficient statistics, based on the received utterance. For example, the statistics may include mel-frequency cepstral data computed from the utterance. In some embodiments, sufficient statistics may be computed instead, such as the mean and second moment of the mel-frequency cepstral data. The statistics and/or sufficient statistics may be different for different types of adaptation data.

In further embodiments, the user device 110 may be configured to compute adaptation data. The adaptation data may include signal processing data (e.g., for performing beamforming, gain control, and echo cancellation), channel normalization data (e.g., cepstral means and/or cepstral variances that may be used to normalize feature vectors), an estimated vocal tract length that may be used to normalize the frequencies of speech through a warping procedure, speaker adaptive transforms such as a cMLLR (constrained maximum likelihood linear regression) transform, and the like. The adaptation data may be computed based on the statistics and may be used to adjust the received utterance so that the received utterance corresponds more closely to the speech models used during speech recognition.

The adaptation data may include speaker transforms, environment transforms, or a combination of the two. Speaker transforms may be associated with a particular user and/or a particular device. For example, if it is known that an utterance has been received from a particular user and/or a particular device, a specific speaker transform may be applied to the utterance during speech recognition. Environment transforms may be associated with a particular location. For example, if it is known that an utterance has been received while the user is in a particular location (e.g., in a certain room, in the car, etc.), a specific environment transform may be applied to the utterance during speech recognition. Ways in which the speaker transform and/or the environment transform may be applied is described in more detail below.

Furthermore, the adaptation data may include session adaptation data (e.g., session transforms), device adaptation data (e.g., device transforms), and/or base adaptation data (e.g., base transforms). Session adaptation data may be based on speech obtained during a current session. For example, a current session may include speech obtained from a single user or a single group of users while the single user or single group of users is located in a particular environment (e.g., while the single user or single group of users is in a particular room of a building, in a car, etc.). The current session may be limited to speech obtained for the purposes of speech recognition. Device adaptation data may be based on speech obtained across multiple sessions or based on all speech obtained by the device, such as the user device 110. For example, the device adaptation data may be based on any speech ever spoken into the user device 110, regardless of the location of the user or group of users, and regardless of whether the speech was obtained for speech recognition purposes. Base adaptation data may be based on speech obtained across multiple sessions and/or based on speech obtained by a plurality of devices. For example, the base adaptation data may be based on any speech spoken into one or more of a plurality of devices. Methods of applying the session, device and/or base adaptation data are described in greater detail below.

In some embodiments, a first set of adaptation data may be combined with a second set of adaptation data to create interpolated adaptation data. For example, where the first adaptation data was created with a small amount of audio data, the first adaptation data may not have sufficient accuracy and the first adaption data may be improved by interpolating it with second adaptation data. For example, where session adaptation data is based on a small amount of speech, it may be combined with device adaptation data. Where device adaptation data is based on a small amount of speech, it may be combined with base adaptation data.

Adaptation data may be interpolated using any techniques known to one of skill in the art. For example, the interpolated adaptation data may be a weighted sum of first adaptation data and second adaptation data. In some embodiments, the interpolated adaptation data may be equivalent to interpolating the results of applying the first adaptation data and applying the second adaptation data.

In an embodiment, the user device 110 is a computing device. For example, the user device 110 may be an electronic device, such as a cell phone, a smart phone, a tablet, a laptop, a personal digital assistant (PDA), a computer, a desktop, a workstation, an electronic book reader, a set-top box, a camera, an audiobook player, a digital media player, a video game console, a server, a terminal, a kiosk, a clock, or the like. The user device 110 may include a microphone, a speaker, a wireless module, a camera, and/or a display. In another embodiment, the user device 110 is a module or application that is executed by another device. The user device 110 is described in greater detail with respect to FIG. 5.

In another embodiment, the user device 110 is an electronic device that lacks significant computer power. For example, the user device 110 may be a device capable of capturing audio and transmitting it over a network, such as a microphone, camera, or the like.

The user device 110 may be in communication with a local data store 150. The local data store 150 may store statistics calculated from received utterances and/or adaptation data computed based on the statistics. As discussed above, the statistics and/or adaptation data may be used to adjust a received utterance so that the received utterance corresponds more closely to the speech models used during speech recognition. Often, a person speaks in a similar manner and/or in a similar location. Thus, it may be beneficial to store the statistics and/or adaptation data so that they may be reused.

As an example, the local data store 150 may store a set of statistics associated with utterances received by the user device 110. The stored statistics may include additional information, such as a time that the statistics were calculated (e.g., a timestamp). The local data store 150 may also store adaptation data, such as one or more speaker transforms (e.g., one speaker transform for each user that performs speech recognition using the user device 110), one or more environment transforms (e.g., one environment transform for each location in which the user device 110 may be present), and/or one or more speaker/environment transforms (e.g., a combined transform that incorporates a speaker transform and an environment transform). The adaptation data may be considered session transforms. In some embodiments, the local data store 150 is a single data store. In other embodiments, the local data store 150 is distributed over many different locations.

As discussed above, the user device 110 may also be in communication with a speech recognition server device 140 directly or through a network 120. The network 120 may be a wired network, a wireless network, or a combination of the two. For example, the network 120 may be a personal area network, a local area network (LAN), a wide area network (WAN), or combinations of the same. Protocols and components for communicating via any of the other aforementioned types of communication networks, such as the TCP/IP protocols, can be used in the network 120.

In some embodiments, the speech recognition server device 140 is configured to facilitate the recognition of speech uttered by the user. For example, the speech recognition server device 140 may produce speech recognition results (e.g., a transcript, etc.) based on an utterance received from the user device 110. The speech recognition server device 140 may be further configured to calculate the statistics and/or to compute adaptation data, as described below.

The speech recognition server device 140 may be a computing device. For example, the speech recognition server device 140 may include one or more processors to execute one or more instructions, memory, and communication devices to transmit and receive data over the network 120. In some embodiments, the speech recognition server device 140 is implemented as one or more backend servers capable of communicating over a network. In other embodiments, the speech recognition server device 140 is implemented by one more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the speech recognition server device 140 may be represented as a user computing device capable of communicating over a network, such as a laptop or tablet computer, personal computer, personal digital assistant (PDA), hybrid PDA/mobile phone, mobile phone, global positioning system (GPS) device, or the like.

While FIG. 2 illustrates a single user device 110, the speech recognition server device 140 may be in communication with a plurality of user devices 110. Likewise, while FIG. 2 illustrates a single speech recognition server device 140, the user device 110 may be in communication with a plurality of speech recognition server devices 140.

In an embodiment, the speech recognition server device 140 is in communication with the remote data store 160. The remote data store 160 may store statistics calculated from received utterances, adaptation data computed based on the statistics, one or more language models, one or more acoustic models, and/or language model and/or acoustic model preferences. For example, the remote data store 160 may store a set of statistics associated with utterances received by the user device 110. The stored statistics may include additional information, such as a time that the statistics were calculated. The remote data store 160 may also store adaptation data, such as one or more speaker transforms (e.g., one speaker transform for each user that performs speech recognition using the user device 110), one or more environment transforms (e.g., one environment transform for each location in which the user device 110 may be present), one or more speaker/environment transforms (e.g., a combined transform that incorporates a speaker transform and an environment transform), and/or one or more base transforms. The speaker transforms, the environment transforms, and/or the speaker/environment transforms may be considered session transforms.

In some embodiments, the speech recognition server device 140 may determine one or more language models and/or one or more acoustic models that are appropriate to use for the user of the user device 110. For example, based on speech recognition previously performed (e.g., the calculated statistics), the speech recognition server device 140 may determine which language models and/or which acoustic models produce better or the best results when the user of the user device 110 speaks. Such preferences may be stored in the remote data store 160.

The remote data store 160 may be accessible by one or more speech recognition server devices 140. In some embodiments, the remote data store 160 is a single data store. In other embodiments, the remote data store 160 is distributed over many different locations.

As described above, the statistics may be calculated by the user device 110 or the speech recognition server device 140. Likewise, the adaptation data may be computed by the user device 110 or the speech recognition server device 140. Thus, the statistics and/or the adaptation data may be stored in the local data store 150 and/or the remote data store 160. Such embodiments are described in greater detail below with respect to FIGS. 3A, 3B, and 4.

Adaptation Data Computed by the Server

Figure 3A:
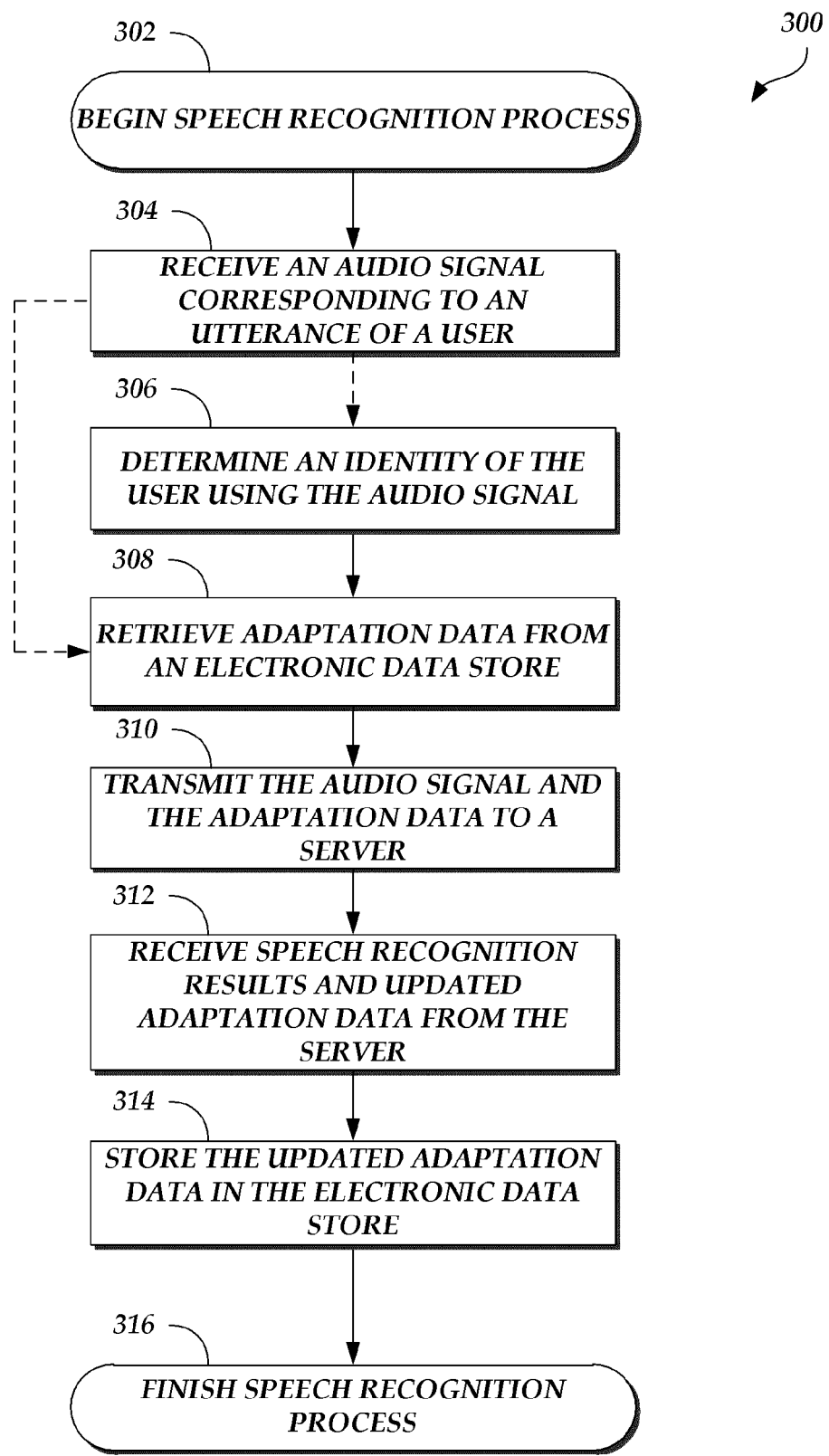
FIG. 3A is a flow diagram depicting an illustrative routine for performing speech recognition.

In an embodiment, the speech recognition server device 140 may compute the adaptation data based on an utterance received by the user device 110, as described in more detail below with respect to FIGS. 3A and 3B. FIG. 3A illustrates a routine 300 for performing speech recognition. In particular, FIG. 3A illustrates a routine 300 for performing speech recognition from the perspective of the user device 110 when the speech recognition server device 140 calculates the adaptation data and/or statistics. A user device 110, as described herein with respect to FIGS. 2 and 5, may be configured to execute the routine 300. The routine 300 begins at block 302. The routine 300 may be an interactive routine initiated on demand by a user or an automated routine, such as might be executed on a periodic or aperiodic schedule. At block 302, the routine 300 begins the speech recognition process.

At block 304, an audio signal corresponding to an utterance of a user is received. The utterance may be received for the purposes of performing speech recognition. After block 304, the routine 300 may proceed to block 306 or block 308.

At block 306, an identity of the user is optionally determined. The identity of the user may be determined using any techniques known to one skilled in the art, such as methods for performing speaker recognition. The identity of the user may be based on an Internet Protocol (IP) address, a phone number, a speaker identification, an authenticated session, or the like. In an embodiment, determining the identity of the user may aid in retrieving the statistics and/or adaptation data that are associated with the user or local device. For example, if the statistics and/or adaptation data are stored in an electronic data store accessible by one or more servers, the identity of the user may aid in retrieving the correct statistics and/or adaptation data during speech recognition.

In other embodiments, not shown, if the identity of the user cannot be determined, the most recent statistics and/or adaptation data may be retrieved. The most recent statistics and/or adaptation data (e.g., statistics and/or adaptation data computed within a predetermined amount of time) may be derived from a fewer number of speakers. Thus, the most recent statistics and/or adaptation data may be more likely to be associated with the user or local device.

At block 308, adaptation data is retrieved from an electronic data store. For example, the adaptation data may be retrieved from the local data store 150. The adaptation data may include a speaker transform, an environment transform, and/or a speaker/environment transform. In an embodiment, the selection of the adaptation data depends on the identity of the user and/or the location of the user. For example, a speaker transform may be associated with the user and retrieved when the user makes an utterance. The location of the user may be determined (e.g., via a GPS device, the audio characteristics of the audio signal, the noise present in the environment, etc.) and the appropriate environment transform or the appropriate combined transform may be retrieved.

At block 310, the audio signal and the adaptation data are transmitted to a server. For example, the audio signal and the adaptation data may be transmitted to the speech recognition server device 140.

In an embodiment, the speech recognition server device 140 may perform speech recognition based on the audio signal and the adaptation data. The speech recognition server device 140 may also update the adaptation data. The speech recognition process performed by the speech recognition server device 140 is described in greater detail below with respect to FIG. 3B.

At block 312, speech recognition results and updated adaptation data are received from the server. For example, a transcript and updated adaptation data may be received from the speech recognition server device 140. The transcript may include the results of the speech recognition process. The adaptation data may be updated to take into account statistics derived from the transmitted audio signal. For example, the audio signal may be analyzed by the speech recognition server device 140 to calculate new statistics. The new statistics may be used along with any previously calculated statistics to compute the updated adaptation data.

In some embodiments, the transcript and the updated adaptation data are received during the speech recognition process. For example, the transcript and the updated adaptation data are received at the same time or at nearly the same time.

In other embodiments, the transcript and the updated adaptation data are received asynchronously. For example, the user or the application performing the speech recognition may desire the speech recognition results as quickly as possible. Accordingly, the transcript may be received at a first time. At a second, later time, the updated adaptation data may be received. As an example, the updated adaptation data may be received when the routine 300 is not performing any operations.

At block 314, the updated adaptation data are stored in the electronic data store. For example, the updated adaptation data may be stored in an entry in the local data store 150 that previously included in the adaptation data sent to the server.

In an embodiment, the updated adaptation data may then be used during speech recognition performed at a later time. For example, during the next speech recognition process (e.g., when a second audio signal corresponding to a second utterance of the user is received), the second audio signal and the updated adaptation data may be sent to the speech recognition server device 140. The speech recognition server device 140 may generate speech recognition results based on the second audio signal and the updated adaptation data. After the updated adaptation data has been stored in the electronic data store, the speech recognition process may be complete, as shown in block 316.

Figure 3B:
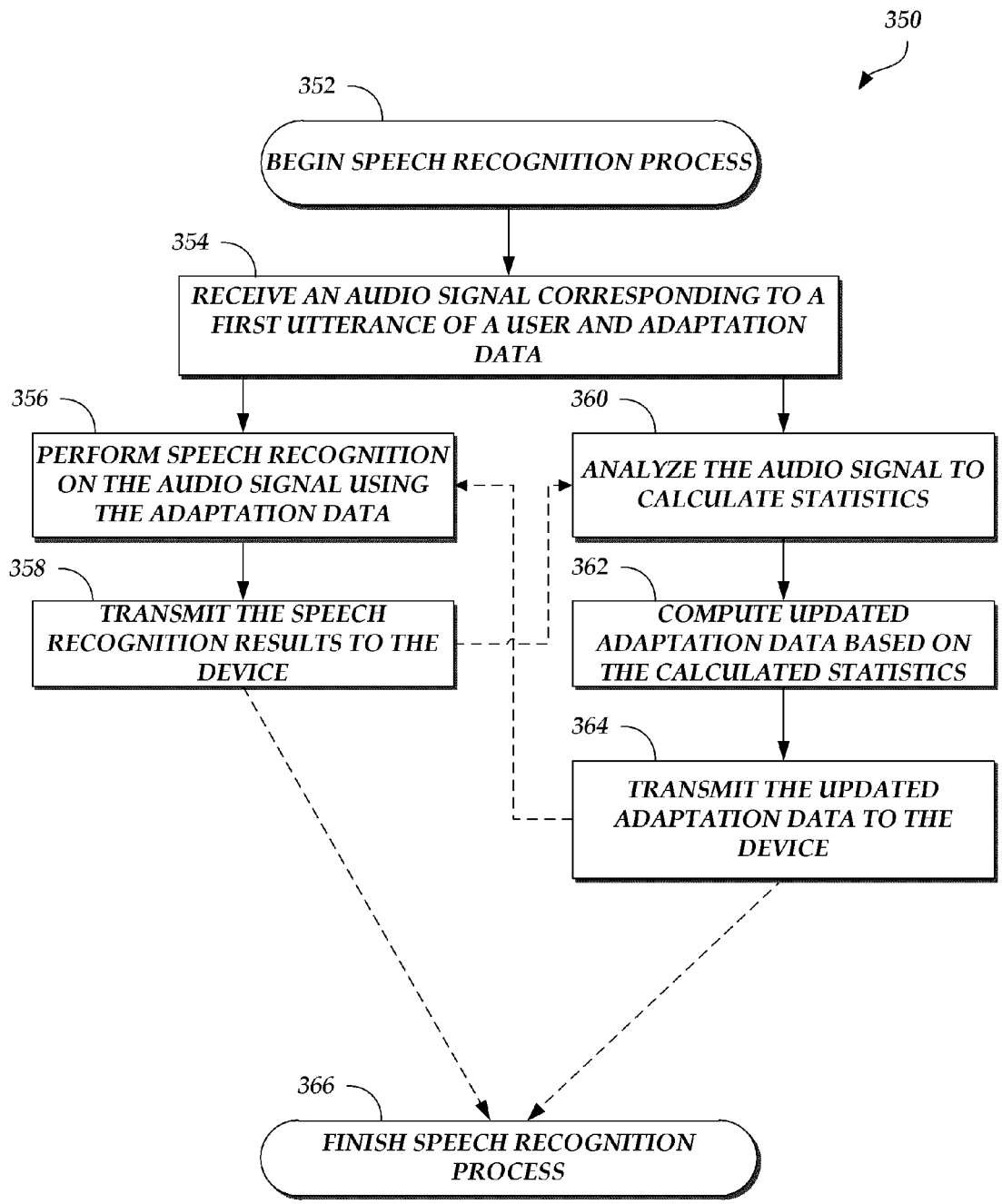
FIG. 3B is another flow diagram depicting an illustrative routine for performing speech recognition.

FIG. 3B illustrates a routine 350 for performing speech recognition. In particular, FIG. 3B illustrates a routine 350 for performing speech recognition by a speech recognition server device 140 when the speech recognition server device 140 computes the adaptation data. A speech recognition server device 140, as described herein with respect to FIG. 2, may be configured to execute the routine 350. The routine 350 begins at block 352. The routine 350 may be an interactive routine initiated on demand by a user. In other embodiments, the routine 350 is an automated routine, such as might be executed on a periodic or aperiodic schedule. At block 352, the routine 350 begins the speech recognition process.

At block 354, an audio signal corresponding to an utterance of a user and adaptation data are received. The audio signal and the adaptation data may be received from the user device 110 for the purposes of performing speech recognition.

In an embodiment, after block 354, the routine 350 proceeds to block 356. Once blocks 356 and 358 have been performed, the routine 350 proceeds to block 360. For example, the routine 350 may proceed to block 356 first in order to ensure that speech recognition results are quickly provided to the user device 110. The updated adaptation data may be provided to the user device 110 at a later time, for example when the user device 110 is idle or otherwise not performing any vital operations.

In another embodiment, after block 354, the routine 350 proceeds to block 360. Once blocks 360 through 364 have been performed, the routine 350 proceeds to block 356. For example, the routine 350 may proceed to block 360 first in order to calculate statistics and compute updated adaptation data that can be used during speech recognition.

In still another embodiment, after block 354, the routine 350 proceeds to blocks 356 and 360 simultaneously or nearly simultaneously. For example, blocks 356 and 360, and the blocks that follow, may be performed synchronously so that speech recognition results and updated adaptation data can be transmitted to the user device 110 during the speech recognition process.

At block 356, speech recognition is performed on the audio signal using adaptation data. In some embodiments, the adaptation data may be applied to the audio signal. Applying adaptation data to an audio signal may transform the feature vectors of the audio signal such that the transformed feature vectors correspond more closely to the speech models. One or more acoustic models and/or one or more language models may be used with the transformed feature vectors to generate speech recognition results (e.g., a transcript). The one or more acoustic models and/or the one or more language models may be selected based on the preferences associated with the user stored in the remote data store 160.

The adaptation data may be applied to the feature vectors using a variety of mathematical operations. For example, the feature vectors may be modified by subtracting a mean vector and dividing by a variance vector (e.g., for applying cepstral means and cepstral variances), the feature vectors may be modified by applying a linear or affine transformation (e.g., for applying a cMLLR transform), the feature vectors may be modified by a warping procedure (e.g., for applying a vocal tract length normalization), or any combination of the foregoing.

In further embodiments, additional data may be used to generate the speech recognition results. For example, data other than the statistics (e.g., data other than acoustic data) may be calculated based on the received utterance. Such data may include metadata associated with the user, like the age, gender, accent, native language, profession, hobbies, habits, and preferences of the user. As an example, the metadata associated with the user may be used to select and/or modify a particular language model used during speech recognition to generate the speech recognition results.

In other embodiments (not shown in FIG. 3), the routine 350 may apply base adaptation data (e.g., a base transform, etc.) to the audio signal. For example, when a new session is started, no audio signal associated with the user may have been received at a previous time. Thus, no adaptation data associated with the user may have been previously computed and no adaptation data may have been received from the user device 110. The base transform may serve as a backup to ensure that speech recognition can be performed. In an embodiment, the base transform may be retrieved from the remote data store 160.

In still other embodiments, a combination of the adaptation data and the base transform are applied to the audio signal. The adaptation data and the base transform may be combined using interpolation, weighting, or other techniques. For example, if a session was recently started, one or more session transforms associated with the user may have been generated, but the session transforms may have been generated based on a limited amount of statistics. The base transform may be used to supplement any deficiencies present in the session transform. Over time, as more statistics are calculated, higher weights may be applied to the session transforms than the base transform.

At block 358, the speech recognition results are transmitted to the device. For example, the speech recognition results may be transmitted to the user device 110. At block 360, the audio signal is analyzed to calculate statistics. For example, the routine 350 may analyze the audio signal to compute statistics, such as statistics of mel-frequency cepstral data.

In an embodiment, the statistics may be stored in an electronic data store. For example, the statistics calculated based on the audio signal may be stored in an entry of the remote data store 160 associated with the user. The statistics may supplement any statistics already stored in the entry associated with the user.

In another embodiment, the statistics may be transmitted to the user device 110 and stored in an electronic data store accessible by the user device 110. For example, the statistics calculated based on the audio signal may be transmitted to the user device 110 and stored in the local data store 150. The statistics may supplement any statistics already stored in the local data store 150.

At block 362, updated adaptation data is computed based on at least a portion of the calculated statistics. In some embodiments, a subset of the calculated statistics is used to compute the updated adaptation data. For example, it may be determined that the user is present in a certain geographic location. Statistics associated with that particular geographic location (e.g., statistics calculated from utterances spoken at the geographic location, etc.) may be used to compute the updated adaptation data. As another example, as discussed above, the statistics may be associated with a time by which they were generated. Statistics that were calculated past a certain time (e.g., statistics more than a day old, more than a week old, etc.) may not be used to compute the updated adaptation data.

At block 364, the updated adaptation data is transmitted to the device. For example, the updated adaptation data may be transmitted to the user device 110. The user device 110 may store the updated adaptation data in the local data store 150. As discussed above, the updated adaptation data may be received and used for speech recognition when another utterance is received from the user for speech recognition purposes.

In other embodiments, not shown, the updated adaptation data and/or the calculated statistics are/is stored in an entry of the remote data store 160 associated with the user. Adaptation data and/or calculated statistics previously stored in the entry may be supplemented, as well. After the speech recognition results and the updated adaptation data have been transmitted to the device, the speech recognition process may be complete, as shown in block 366.

Adaptation Data Computed by the Device

Figure 4:
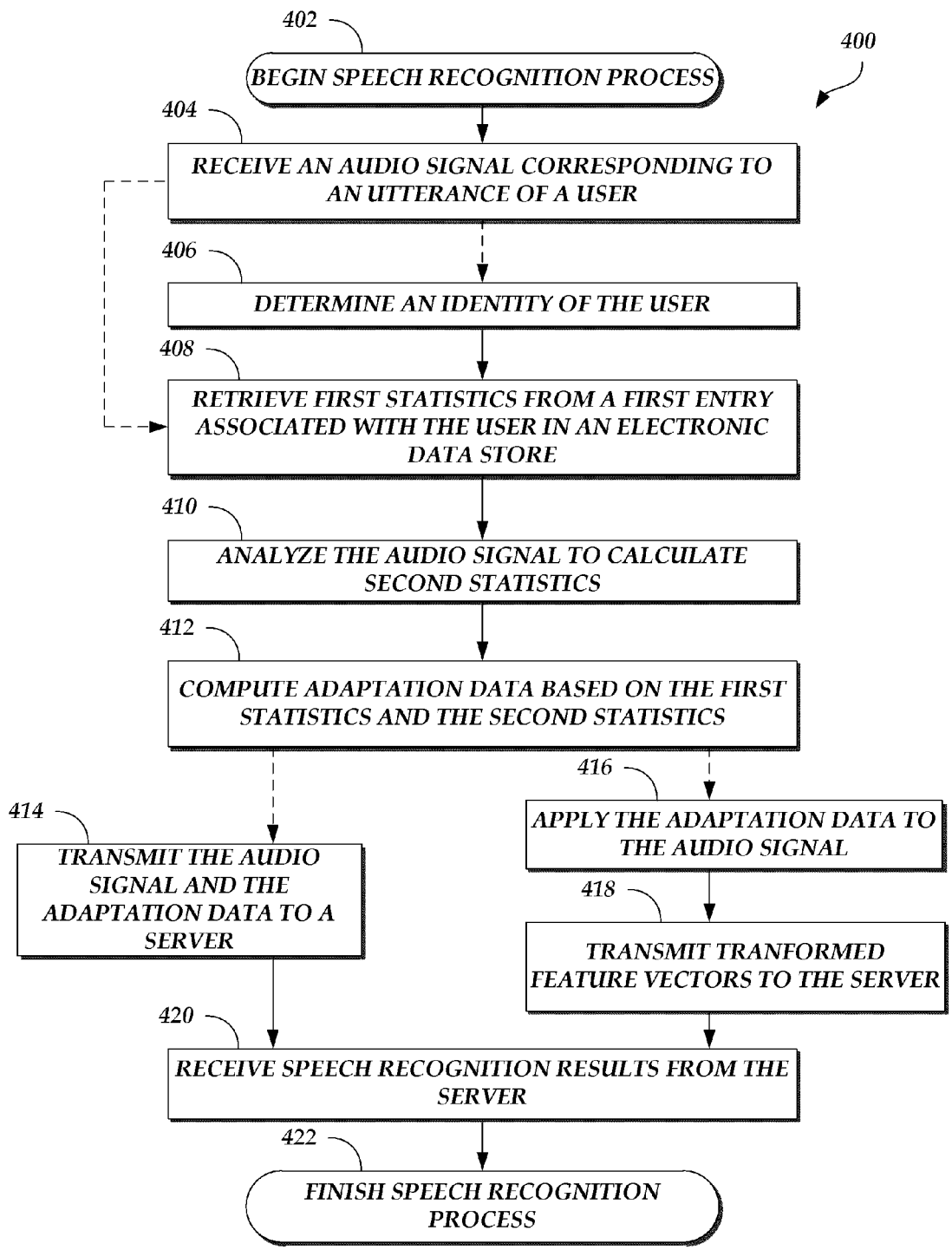
FIG. 4 is another flow diagram depicting an illustrative routine for performing speech recognition.

In an embodiment, the user device 110 may compute the adaptation data based on a received utterance. FIG. 4 illustrates a routine 400 for performing speech recognition. In particular, FIG. 4 illustrates a routine 400 for performing speech recognition from the perspective of the user device 110 when the user device 110 computes the adaptation data. A user device 110, as described herein with respect to FIGS. 2 and 5, may be configured to execute the routine 400. The routine 400 begins at block 402. The routine 400 may be an interactive routine initiated on demand by a user or an automated routine, such as might be executed on a periodic or aperiodic schedule. At block 402, the routine 400 begins the speech recognition process.

At block 404, an audio signal corresponding to an utterance of a user is received. As discussed above, the utterance may be received for the purposes of performing speech recognition.

At block 406, an identity of the user using the audio signal is optionally determined. The identity of the user may be determined using any techniques known to one skilled in the art, such as methods for performing speaker recognition. In an embodiment, determining the identity of the user may aid in retrieving the statistics and/or adaptation data that are associated with the user.

At block 408, first statistics are retrieved from a first entry associated with the user in an electronic data store. The first statistics may include statistics used to compute adaptation data. The statistics may have been calculated at one or more previous times. Specifically, the statistics may have been calculated when speech recognition was previously performed. In an embodiment, the previously calculated statistics are retrieved from an entry in the local data store 150 associated with the user. In another embodiment, the previously calculated statistics are retrieved from the remote data store 160 via the speech recognition server device 140. In some embodiments, the first statistics are previously stored adaptation data.

At block 410, the audio signal is analyzed to calculate second statistics. For example, the audio signal may be analyzed to identify statistics, such as statistics of mel-frequency cepstral data.

In an embodiment, the second statistics may be stored in an electronic data store accessible by the routine 400 (e.g., a device executing all or part of the routine 400). For example, the statistics calculated based on the audio signal may be stored in the local data store 150. The statistics may supplement any statistics already stored in the local data store 150.

At block 412, adaptation data are computed based on at least a portion of the first statistics and at least a portion of the second statistics. In some embodiments, a subset of the first statistics and/or a subset of the second statistics are used to compute the adaptation data. For example, it may be determined that the user is present in a certain location. Statistics relevant to the particular location may be used to compute the adaptation data, whereas statistics not relevant to the particular location may not be used to compute the adaptation data. As another example, as discussed above, the statistics may be associated with a time by which they were generated. Statistics that were calculated past a certain time (e.g., statistics more than a day old, more than a week old, etc.) may not be used to compute the adaptation data.

In some embodiments, the routine 400 proceeds to block 414 after block 412. For example, while the adaptation data are computed by the user device 110, it may be desired that the speech recognition server device 140 apply the adaptation data to an audio signal before performing the speech recognition.

At block 414, the audio signal and the adaptation data are transmitted to a server. For example, the audio signal and the adaptation data may be transmitted to the speech recognition server device 140. The speech recognition server device 140 may be configured to perform speech recognition using the audio signal and the adaptation data as described above with respect to FIG. 3.

In other embodiments, after block 412 the routine 400 proceeds to block 416. For example, it may be desired that the speech recognition server device 140 not receive any statistics information associated with the user. The speech recognition server device 140 may be configured to receive transformed audio data, such as transformed feature vectors, perform speech recognition on the transformed feature vectors, and return the speech recognition results.

At block 416, the adaptation data are applied to the audio signal. Applying adaptation data to an audio signal may transform the feature vectors of the audio signal such that the transformed feature vectors correspond more closely to the speech models.

At block 418, the transformed feature vectors are transmitted to the server. For example, the transformed feature vectors may be transmitted to the speech recognition server device 140. As described above, the speech recognition server device 140 may perform speech recognition on the transformed feature vectors. The speech recognition server device 140 may not have to modify the transformed feature vectors in any way before performing the speech recognition.

At block 420, speech recognition results are received from the server. For example, a transcript may be received from the speech recognition server device 140. After the speech recognition results have been received, the speech recognition process may be complete, as shown in block 422.

In some embodiments, it may be desired to send the audio signal to the server device 140 as quickly as possible. For example, user device 110 may retrieve stored adaptation data from the local data store 150 and send the adaptation data and the audio signal to the server device 140 without updating the adaptation data, or the user device 110 may transform the audio data using the retrieved adaptation data and send the transformed audio data to the server device 140 without updating the adaptation data. After sending the audio signal or transformed audio signal to the server device 140, the user device 110 may update the adaptation data as described above.

User Device

Figure 5:
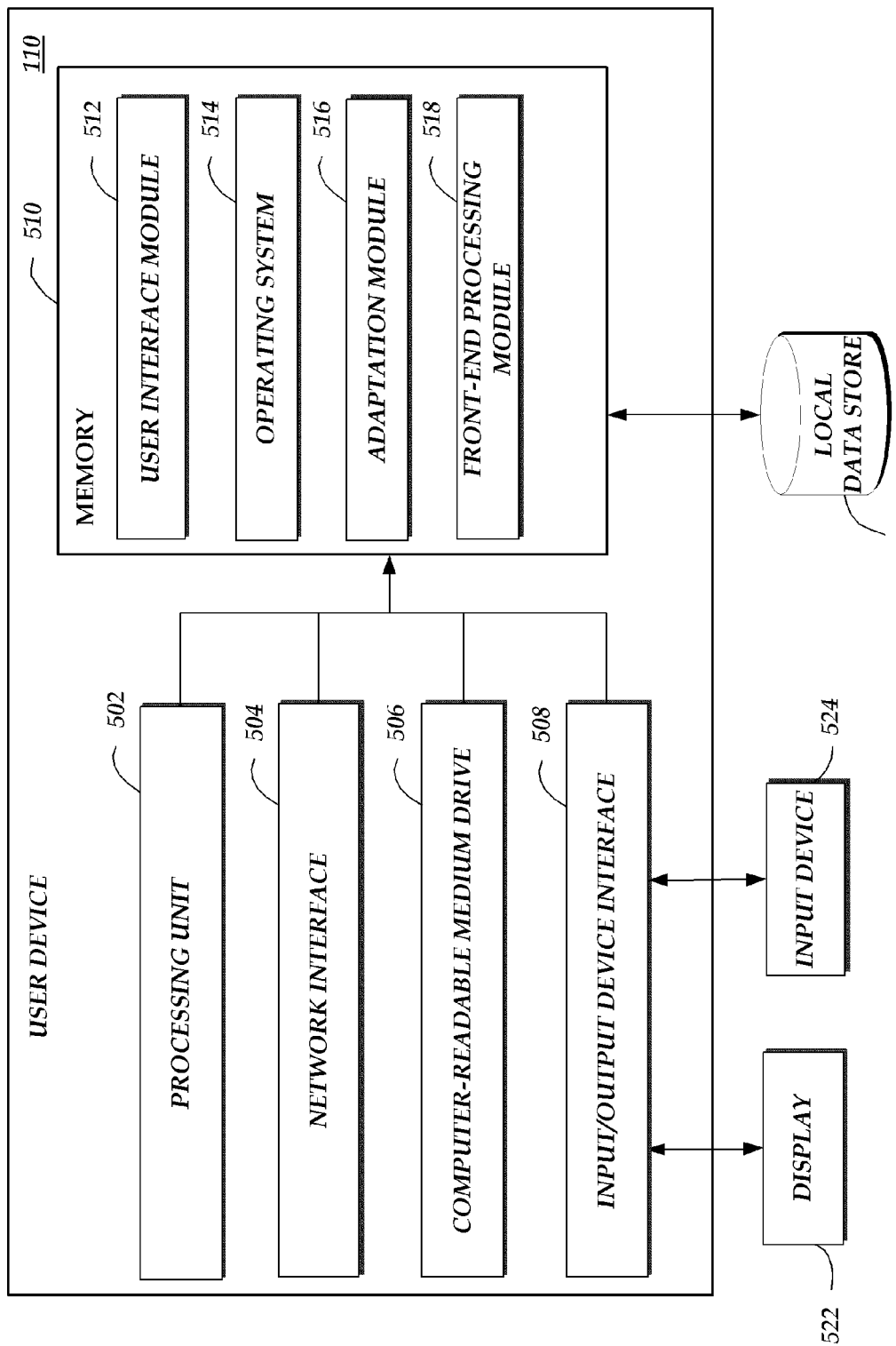
FIG. 5 is a schematic diagram of an illustrative user device.

FIG. 5 is a schematic diagram of a user device 110 compatible with the devices, systems and methods described herein. The user device 110 includes an arrangement of computer hardware and software components that may be used to implement aspects of the present disclosure. Those skilled in the art will appreciate that the user device 110 may include more (or fewer) components than those shown in FIG. 5. It is not necessary, however, that all of these generally conventional components be shown in order to provide an enabling disclosure.

The user device 110 includes a processing unit 502, a network interface 504, a non-transitory computer-readable medium drive 506, and an input/output device interface 508, all of which may communicate with one another by way of a communication bus. As illustrated, user device 110 is optionally associated with, or in communication with, a display 522 and an input device 524. The display 522 and input device 524 may be used in embodiments in which users interact directly with the user device 110. The network interface 504 may provide the user device 110 with connectivity to one or more networks or computing systems. The processing unit 502 may thus receive information and instructions (such as utterances, language models, and text) from other computing systems or services via a network. The processing unit 502 may also communicate to and from memory 510 and further provide output information for a display 522 via the input/output device interface 508. The input/output device interface 508 may accept input from the input device 524, such as a keyboard, mouse, digital pen, touch screen, or gestures recorded via motion capture. The input/output device interface 524 may also output audio data to speakers or headphones (not shown) or receive audio input (such as an utterance) from a microphone or receiver.

The memory 510 may contain computer program instructions that the processing unit 502 may execute in order to implement one or more embodiments of the present disclosure. The memory 510 generally includes RAM, ROM and/or other persistent or non-transitory computer-readable storage media. The memory 510 may store an operating system 514 that provides computer program instructions for use by the processing unit 502 in the general administration and operation of the user device 110. The memory 510 may further include other information for implementing aspects of the present disclosure. For example, in one embodiment, the memory 510 includes a user interface module 512 that facilitates generation of user interfaces (such as by providing instructions therefor) for display upon a computing device.

In addition, memory 510 may optionally include or communicate with the local data store 526. The local data store 526 may contain statistics and/or adaptation data. The local data store 526 may be embodied in hard disk drives, solid state memories, and/or any other type of non-transitory computer-readable storage medium accessible to the user device 110. The local data store 526 may also be distributed or partitioned across multiple storage devices as is known in the art without departing from the spirit and scope of the present disclosure. In an embodiment, the local data store 526 may be similar to the local data store 150 as illustrated with respect to FIG. 2.

In addition to the user interface module 512, the memory 510 may include an optional adaptation module 516 that may be executed by the processing unit 502. In one embodiment, the adaptation module 516 implements aspects of the present disclosure. For example, the adaptation module 516 may be configured to calculate statistics and/or compute adaptation data based on a received utterance. The adaptation module 516 may also be configured to retrieve statistics and/or adaptation data from a data store, such as the local data store 526, and store statistics and/or adaptation data in the data store.

In addition to the adaptation module 516, the memory 510 may include an optional front-end processing module 518. In one embodiment, the front-end processing module 518 implements aspects of the present disclosure. For example, the front-end processing module 518 may be configured to compute feature vectors from the audio data and apply the adaptation data to the audio data. For example, the front-end processing module 518 may be configured to apply transforms to audio data to generate transformed feature vectors that may be transmitted to a server for speech recognition purposes.

The user device 110 may be embodied in a variety of environments, and may be represented as a single computing device or as multiple computing devices. In still other embodiments, the user device 110 may be represented as a user computing device capable of communicating over a network, such as a laptop or tablet computer, personal computer, personal digital assistant (PDA), hybrid PDA/mobile phone, mobile phone, global positioning system (GPS) device, electronic book reader, set-top box, camera, clock, audiobook player, digital media player, video game console, in-store kiosk, television, one or more processors, integrated components for inclusion in computing devices, appliances, electronic devices for inclusion in vehicles or machinery, gaming devices, or the like.

It should be noted that the speech recognition server device 140 may include some or all of the components present in the user device 110 as discussed herein with respect to FIG. 5. In addition, the speech recognition server device 140 may include additional components not present in the user device 110 as discussed herein with respect to FIG. 5.

For example, the speech recognition server device 140 may include a speech recognition module that may be executed by a processing unit. In an embodiment, the speech recognition module implements aspects of the present disclosure. For example, the speech recognition module may receive an utterance and adaptation data, apply the adaptation data to the utterance to generate transformed feature vectors, perform speech recognition on the transformed feature vectors to generate speech recognition results, and send the speech recognition results to a device, such as the user device 110.

Terminology

Many of the operations of the present disclosure are sufficiently mathematically or technically complex that one or more computing devices may be necessary to carry them out. For example, calculating statistics, computing adaptation data, and applying the adaptation data to audio data effectively requires resort to a computing device owing to the volume and complexity of the calculations involved. Additionally, a computing device may also be required to communicate over a network.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A system comprising:
an electronic data store configured to store adaptation data; and
a user device in communication with the electronic data store, the user device configured to:
receive a first voice signal corresponding to a first utterance of a user;
retrieve first adaptation data from the electronic data store;
transmit the first voice signal and the first adaptation data to a server device over a network, wherein the server device is configured to:
compute first feature vectors using the first voice signal;
compute updated adaptation data using the first voice signal;
compute first transformed feature vectors using the updated adaptation data and the first feature vectors;
perform speech recognition using the first transformed feature vectors to obtain speech recognition results;
transmit the speech recognition results to the user device; and
transmit the updated adaptation data to the user device;
receive the updated adaptation data from the server device; and
store the updated adaptation data in the electronic data store.

2. The system of claim 1, wherein the user device is further configured to:
receive a second voice signal corresponding to a second utterance of the user;
retrieve the updated adaptation data from the electronic data store; and
transmit the second voice signal and the updated adaptation data to the server device over the network, wherein the server device is configured to:
compute second feature vectors using the second voice signal;
compute second updated adaptation data using the second voice signal;
compute second transformed feature vectors using the second updated adaptation data and the second feature vectors;
perform speech recognition using the second transformed feature vectors to obtain second speech recognition results; and
transmit the second speech recognition results to the user device.

3. The system of claim 1, wherein the first adaptation data comprises at least one of channel normalization data, an estimated vocal tract length, or a speaker adaptive transform.

4. The system of claim 1, wherein the user device is further configured to obtain an identification of the user, wherein retrieving the first adaptation data comprises using the identification of the user, and wherein the first adaptation data is associated with the user.

5. A computer-implemented method, comprising:
as implemented by one or more computing devices configured with specific computer-executable instructions,
receiving a first voice signal corresponding to a first utterance of a user;
retrieving first adaptation data from an electronic data store;
transmitting the first voice signal and the first adaptation data to a server device over a network, wherein the server device is configured to compute first feature vectors using the first voice signal, compute first transformed feature vectors using the first adaptation data and the first feature vectors, and perform speech recognition using the first transformed feature vectors, and wherein the server device is configured to generate second adaptation data using the first adaptation data;
receiving speech recognition results from the server device;
receiving the second adaptation data from the server device; and
storing the updated adaptation data in the electronic data store.

6. The computer-implemented method of claim 5, wherein the speech recognition results are received in a first transmission, and wherein the updated adaptation data is received in a second transmission.

7. The computer-implemented method of claim 5, further comprising:
receiving a second voice signal corresponding to a second utterance of the user;
retrieving the second adaptation data from the electronic data store; and
transmitting the second voice signal and the second adaptation data to the server device over the network, wherein the server device is configured to perform speech recognition using the second voice signal, and wherein the server device is configured to generate third adaptation data using the second adaptation data; and
receiving second speech recognition results from the server device.

8. The computer-implemented method of claim 5, wherein the server device is further configured to generate the second adaptation data.

9. The computer-implemented method of claim 5, wherein the first adaptation data comprises at least one of channel normalization data, an estimated vocal tract length, or a speaker adaptive transform.

10. The computer-implemented method of claim 5, wherein the first adaptation data comprises a speaker transform and an environment transform, wherein the speaker transform is associated with speech characteristics of the user, and wherein the environment transform is associated with acoustic characteristics of a location of the user.

11. The computer-implemented method of claim 5, further comprising obtaining an identification of the user, wherein retrieving the first adaptation data comprises using the identification of the user, and wherein the first adaptation data is associated with the user.

12. The computer-implemented method of claim 5, wherein the server device is configured to compute the first transformed feature vectors using first feature vectors and at least one of the first adaptation data or the second adaptation data.

13. A computer-implemented method, comprising:
as implemented by one or more computing devices configured with specific computer-executable instructions,
receiving, from a user device, a first voice signal corresponding to a first utterance of a user and first adaptation data;
computing second adaptation data using the first voice signal;
computing a modified first voice signal using the first voice signal and at least one of the first adaptation data or the second adaptation data;
performing speech recognition on the modified first voice signal to obtain speech recognition results;
transmitting the speech recognition results to the user device; and
transmitting the second adaptation data to the user device.

14. The computer-implemented method of claim 13, wherein computing second adaptation data comprises:
calculating statistics from the first voice signal; and
computing the second adaptation data using the calculated statistics.

15. The computer-implemented method of claim 13, further comprising receiving an identification of the user and wherein performing speech recognition on the first voice signal comprises using the identification of the user.

16. The computer-implemented method of claim 13, wherein computing a modified first voice signal comprises computing feature vectors using the first voice signal and transforming the computed feature vectors using at least one of the first adaptation data or the second adaptation data.

17. The computer-implemented method of claim 13, wherein computing a modified first voice signal comprises computing feature vectors using the first voice signal and transforming the computed feature vectors using interpolated adaptation data, wherein the interpolated adaptation data is created using base adaptation data.

18. The computer-implemented method of claim 17, wherein the base adaptation data is generated based on data associated with utterances received from a plurality of user devices.

19. A non-transitory computer-readable medium comprising one or more modules configured to execute in one or more processors of a computing device, the one or more modules being further configured to:
receive a first voice signal corresponding to a first utterance of a user;
retrieve adaptation data from an electronic data store;
compute second adaptation data using at least one of the adaptation data and the first voice signal;
modify the first voice signal using the second adaptation data;
transmit the modified first voice signal to a server device;
receive speech recognition results from the server device; and
store the second adaptation data in the electronic data store.

20. The non-transitory computer-readable medium of claim 19, wherein the modified first voice signal comprises transformed feature vectors created by transforming feature vectors created from the first voice signal using the second adaptation data.

21. The non-transitory computer-readable medium of claim 19, wherein the one or more modules are further configured to:
calculate statistics using the first voice signal; and
store the statistics in the electronic data store.

22. The non-transitory computer-readable medium of claim 21, wherein the one or more modules are further configured to compute the second adaptation data using statistics associated with a time that occurred after a predetermined time.

23. The non-transitory computer-readable medium of claim 19, wherein the one or more modules are further configured to:
receive a second voice signal corresponding to a second utterance of the user;
retrieve the second adaptation data;
calculate third adaptation data using at least one of the second adaptation data and the second voice signal;
transmit a representation of the second voice signal to the server device; and
receive second speech recognition results from the server device.

24. The non-transitory computer-readable medium of claim 19, wherein the adaptation data comprises at least one of channel normalization data, an estimated vocal tract length, or a speaker adaptive transform.

25. A system comprising:
an electronic data store configured to store adaptation data; and
a user device in communication with the electronic data store, the user device configured to:
receive a first voice signal corresponding to a first utterance of a user;
retrieve adaptation data from the electronic data store;
compute second adaptation data using at least one of the adaptation data and the first voice signal;
modify the first voice signal using the second adaptation data;
transmit the modified first voice signal to a server device;
receive speech recognition results from the server device; and
store the second adaptation data in the electronic data store.

26. The system of claim 25, wherein the modified first voice signal comprises transformed feature vectors created by transforming feature vectors created from the first voice signal using the second adaptation data.

27. The system of claim 25, wherein the user device is further configured to:
calculate statistics using the first voice signal; and
store the statistics in the electronic data store.

28. The system of claim 27, wherein the user device is further configured to compute the second adaptation data using statistics associated with a time that occurred after a predetermined time.

29. The system of claim 25, wherein the user device is further configured to:
receive a second voice signal corresponding to a second utterance of the user;
retrieve the second adaptation data from the electronic data store;
compute third adaptation data using at least one of the second adaptation data and the second voice signal;
transmit a representation of the second voice signal to the server device;
receive second speech recognition results from the server device; and
store the third adaptation data in the electronic data store.

30. The system of claim 25, wherein the adaptation data comprises at least one of channel normalization data, an estimated vocal tract length, or a speaker adaptive transform.

31. The system of claim 30, wherein the adaptation data comprises a linear transform.

* * * * *